United States Patent Office 3,629,222
Patented Dec. 21, 1971

3,629,222
OLEFIN POLYMERIZATION CATALYSTS
Harry W. Coover, Jr., and Frederick B. Joyner, Kingsport, Tenn., assignors to Eastman Kodak Company, Rochester, N.Y.
No Drawing. Filed Feb. 23, 1961, Ser. No. 90,961
Int. Cl. C08f 3/02
U.S. Cl. 260—93.7
2 Claims

ABSTRACT OF THE DISCLOSURE

Catalyst for the production of solid, crystalline α-monoolefinic hydrocarbon polymers comprising (1) a compound selected from the group consisting of halides and lower alkoxides of a transition metal selected from the group consisting of titanium, zirconium, vanadium, chromium and molybdenum, (2) at least one component selected from the following: (a) a metal from Groups Ia, II and IIIa of the Periodic Table, alkyl and hydride derivatives of the metals in Groups Ia, II and IIIa of the Periodic Table and complex metal hydrides of aluminum and alkali metal; (b) organo-aluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum; and (c) a polymeric reaction product of aluminum and a methylene halide and (3) a third component which is N,N-dimethylthioacetamide, ethyl thiocyanate, tribenzylphosphine oxide, pyridine-N-oxide, 2,3-octadione, diphenyl disulfide, N,N'-diphenylformamidine, dithiooxamide, β-chloroethyl ether, tetramethylthiourea, o-tolyl isocyanate, nitrosobenzene, trimethysulfonium iodide, tetramethylphosphonium bromide, pyrazine, malononitrile, phenylantimony oxide, phenylarsenic oxide, tetramethyldiarsine, nitrobenzene, 2-nitropropane, diphenyl disulfoxide, azoxybenzene, azobenzene, phosphazobenzene, ethyl thiolacetate, phenyl isothiocyanate, arsenobenzene, acetone phenylhydrazone, triphenylstibine sulfide, tetramethyldistibine and arsenophosphobenzene.

This invention relates to a new and improved process for the polymerization of olefinic hydrocarbons. In one aspect, this invention relates to a novel catalyst combination for preparing high molecular weight, solid polyolefins, such as polypropylene of high density and crystallinity. In another aspect, this invention relates to the preparation of polymers of propylene and its higher homologs using a particular catalyst combination which has unexpected catalytic activity and which results in polymeric products characterized by unusually high crystallinity.

Polyethylene has been prepared by high pressure procedures to produce relatively flexible polymers having a rather high degree of chain branching and a density considerably lower than the theoretical density. Thus, pressures of the order of 500 atmospheres and higher and usually of the order of 1,000 to 1,500 atmospheres are commonly employed in such procedures. It has been found that more dense polyethylene can be produced with certain catalyst combinations to give polymers which have relatively little chain branching and a high degree of crystallinity. The exact reason why certain catalyst combinations give these polymers of high density and high crystallinity is not fully understood. Furthermore, the activity of the catalysts ordinarily depends upon certain specific catalyst combinations, and the results are ordinarily highly unpredictable since relatively minor changes in the catalyst combination often lead to liquid polymers rather than the desired solid polymers.

Among the catalysts that have been employed to polymerize ethylene to solid crystalline polymers are combinations that include organoaluminum compounds, such as trialkyl aluminum compounds and alkyl aluminum halide compounds in conjunction with certain inorganic halides. Thus triethyl aluminum in conjunction with titanium trior tetrachloride catalyzes a polymerization reaction for the production of crystalline polyethylene. Similarly, catalytic mixtures of ethyl aluminum sesquichloride in conjunction with titanium trichloride can be used to polymerize ethylene to solid crystalline polymer. However, when catalytic mixtures of ethyl aluminum sesquichloride and titanium trichloride are employed to polymerize propylene the product is predominantly polymeric oils and rubbers with a comparatively small amount of high molecular weight crystalline product being formed. When a mixture of ethyl aluminum sesquichloride and titanium trichloride are employed to polymerize propylene at a comparatively low pressure, the mixture does not act as a catalyst, and substantially no polymer is formed.

Some of the catalytic mixtures that are effective for producing polyethylene cannot be used to produce crystalline, high density polypropylene. Thus, one cannot predict whether a specific catalyst combination will be effective to produce crystalline, high density polymers with specific olefinic hydrocarbons.

It is an object of this invention to provide an improved process for the polymerization of α-monoolefinic hydrocarbons to form solid, high density, crystalline products.

It is another object of this invention to provide an improved process for the polymerization of propylene and higher α-monoolefinic hydrocarbons to produce solid, high density, crystalline products.

It is another object of this invention to provide novel catalyst combinations which have unexpected catalytic activity for the polymerization of α-monoolefinic hydrocarbons to form crystalline high density polymers. Other objects of this invention will be readily apparent from the detailed disclosure.

The above and other objects of this invention are accomplished by means of this invention wherein α-monoolefinic hydrocarbons either singly or in admixture are readily polymerized to high molecular weight, solid, crystalline polymers by effecting the polymerization in the presence of a catalyst composition comprising (1) a compound selected from the group consisting of halides and lower alkoxides of a transition metal selected from the group consisting of titanium, zirconium, vanadium, chromium and molybdenum, (2) at least one component selected from the following: (a) a metal from Groups Ia, II and IIIa of the Periodic Table, alkyl and hydride derivatives of the metals in Groups Ia, II and IIIa of the Periodic Table and complex metal hydrides of aluminum and alkali metals; (b) organoaluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum; and (c) a polymeric reaction product of aluminum and a methylene halide and (3) a third component which is a compound containing atoms from the group consisting of oxygen, phosphorus, arsenic, antimony, sulfur, carbon, hydrogen, a halogen and nitrogen, at least one of said atoms being a hetero atom from the group consisting of oxygen, phosphorus, arsenic, antimony, sulfur and nitrogen, when said compound contains one of sulfur, nitrogen, phosphorus, arsenic and antimony; said compound also contains at least one additional atom from the group consisting of oxygen, sulfur, nitrogen, phosphorus, arsenic, antimony and a halogen; when said compound contains no other hetero atom than oxygen not more than one oxygen atom is bonded directly to the same carbon atom; in said compound oxygen atoms are not bonded directly to an atom from the group consisting of hydrogen and oxygen; when said compound contains only an atom from the group consisting of oxygen and nitrogen as sole hetero atom and no halogen atom is present in said compound, said oxygen and nitrogen atoms are joined to different atoms and the nitrogen atom is bonded to less than three carbon atoms; when an oxygen atom in said compound is bonded directly to two carbon atoms said compound also contains at least one atom from the group consisting of phosphorus, arsenic, antimony, sulfur, nitrogen and a halogen; when said compound contains a phosphorus atom which has all of its valences satisfied by being bonded to oxygen atoms said compound also contains at least one additional hetero atom or halogen; when said compound contains a single phosphorus atom and nitrogen and oxygen are the sole remaining hetero atoms at least one valence of said phosphorus atom is bonded to an atom other than nitrogen and oxygen; when said compound contains phosphorus and nitrogen as the sole hetero atoms at least one valence of the phosphorus atom is satisfied by an atom other than nitrogen; when said compound contains at least one oxygen atom and a single sulfur atom as the sole hetero atoms at least one oxygen atom is not bonded directly to the sulfur atom; and when nitrogen atoms are the sole hetero atoms in said compound the nitrogen atoms are not bonded to any carbon atom containing two hydrogen atoms.

The transition metal compounds of our catalyst system comprise the alkoxides, alkoxyhalides, and halides, such as iodides, chlorides or bromides of a transition metal selected from the group consisting of titanium, vanadium, zirconium, chromium and molybdenum. The transition metal compounds can be used at their maximum valence, and if desired, a reduced valency form of the compound can be employed. It is preferred to use the titanium chlorides which may be in the form of titanium tetrachloride, titanium trichloride and titanium dichloride. Examples of other metal halides and alkoxides that can be employed are titanium tetrabromide, titanium tribromide, zirconium tetrachloride, zirconium tribromide, vanadium trichloride, molybdenum pentachloride, chromium tribromide, titanium tetrabutoxide, vanadium triethoxide, titanium tetraoctoxide, dichlorotitanium dibutoxide and the like.

In addition to the transition metal compounds our catalyst composition contains another component (2) which can be a metal, such as sodium, potassium, lithium, magnesium, zinc, aluminum and the like. The catalyst can also contain certain alkyl and hydride derivatives of these metals; for example, sodium amyl, potassium butyl, lithium propyl, aluminum triethyl, aluminum tripropyl, aluminum tributyl, zinc dibutyl, zinc diamyl, zinc dipropyl, ethyl magnesium bromide, sodium hydride, calcium hydride, lithium aluminum hydride, and the like, can be employed as components of our catalyst mixture. Also, the catalyst composition may contain an organo-aluminum compound, such as ethyl aluminum dichloride, cyclohexyl aluminum dichloride, cyclobutyl aluminum dibromide, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride, and the like. Additionally, our catalyst composition can contain the polymeric reaction product of aluminum and a methyl halide, such as methylene dichloride, as described in the copending application, Ser. No. 549,868, filed Nov. 29, 1955, now abandoned. The polymeric reaction product that can be used in our catalyst composition can be obtained by reacting a methylene halide, such as methylene bromide or methylene chloride, with aluminum, and the product is a complex polymeric material whose structure is not readily definable.

The third component of our catalyst composition can be selected from the following compounds: N,N-dimethylthioacetamide, ethyl thiocyanate, tribenzylphosphine oxide, pyridine-N-oxide, 2,3-octadione, diphenyl disulfide, N,N'-diphenylformamidine, dithiooxamide, β-chloroethyl ether, tetramethylthiourea, o-tolyl isocyanate, nitrosobenzene, trimethylsulfonium iodide, tetramethylphosphonium bromide, pyrazine, malononitrile, phenylantimony oxide, phenylarsenic oxide, tetramethyldiarsine, nitrobenzene, 2-nitropropane, diphenyl disulfoxide, azoxybenzene, azobenzene, phosphazobenzene, ethyl thiolacetate, phenyl isothiocyanate, arsenobenzene, acetone phenylhydrazone, triphenylstibine sulfide, tetramethyldistibine, arsenophosphobenzene, and the like.

Specific catalyst compositions that can be used in practicing our invention include:

(1) sodium, titanium trichloride and N,N-dimethylthioacetamide,
(2) potassium, chromium tribromide and ethyl thiocyanate,
(3) lithium, molybdenum pentacholride and tribenzylphosphine oxide,
(4) zinc, vanadium triethoxide, and pyridine-N-oxide,
(5) magnesium, zirconium tetrachloride and 2,3-octadione,
(6) aluminum, titanium tetrachloride and diphenyl disulfide,
(7) sodium amyl, vanadium triiodide and N,N'-diphenylformamidine,
(8) potassium butyl, titanium tetraoctoxide and dithiooxamide,
(9) lithium propyl, titanium tetrabutoxide and β-chloroethyl ether,
(10) aluminum triethyl, titanium trichloride and tetramethylthiourea,
(11) aluminum tributyl, dichlorotitanium dibutoxide and o-tolyl isocyanate,
(12) zinc dibutyl, vanadium trichloride and nitrosobenzene,
(13) zinc diamyl, zirconium tetraiodide and tetramethylsulfonium iodide,
(14) ethyl magnesium bromide, chromium triiodide and tetramethylphosphonium bromide,
(15) sodium hydride, molybdenum pentabromide and pyrazine,
(16) lithium hydride, vanadium trichloride and malononitrile,
(17) calcium hydride, vanadium tetrapropoxide and phenylantimony oxide,
(18) lithium aluminum hydride, titanium trichloride and phenylarsenic oxide,
(19) sodium aluminum hydride, zirconium tetrachloride and tetramethyldiarsine,
(20) cyclohexyl aluminum dichloride, vanadium tribromide and nitrobenzene,
(21) butyl aluminum dibromide, titanium tetrabutoxide and 2-nitropropane,
(22) dimethyl aluminum iodide, vanadium tributoxide and diphenyl disulfoxide,
(23) propyl aluminum dichloride, ziconium tetrachloride and azoxybenzene,
(24) ethyl aluminum sesquibromide, chromium trichloride and azobenzene,
(25) methyl aluminum sesquiiodide, molybdenum pentabromide and phosphazobenzene,
(26) sodium, vanadium trichloride and ethyl thiolacetate,
(27) lithium hydride, titanium tetrachloride and phenylisothiocyanate,
(28) sodium amyl, vanadium tripropoxide and arsenobenzene,
(29) lithium butyl, titanium tributoxide and acetone phenylhydrazone,
(30) lithium aluminum hydride, titanium trichloride and triphenylstibine sulfide,
(31) magnesium, vanadium tetrabromide and tetramethyldistibine,
(32) aluminum, titanium tetrachloride and arsenophosphobenzene.

The inventive process is carried out in liquid phase in an inert organic liquid and preferably an inert liquid hydrocarbon vehicle, but the process can be carried out in the absence of an inert diluent. The process proceeds with excellent results over a temperature range of from 50° C. to 250° C., although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30 to 1000 p.s.i. give excellent results, and it is not necessary to employ the extremely high pressures which were necessary heretofore. The liquid vehicle employed is a desirable one which serves as an inert liquid reaction medium.

The invention is of particular importance in the preparation of highly crystalline polypropylene, the polybutenes and polystyrene although it can be used for polymerizing ethylene and mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The novel catalysts described above are quite useful for polymerizing propylene to form a crystalline, high-density polymer. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

The limiting factor in the temperature of the process appears to be the decomposition temperature of the catalyst. Ordinarily, temperatures from 50° C. to 150° C. are employed, although temperatures as high as 250° C. can be employed if desired. Usually, it is not desirable or economical to effect the polymerization at temperatures below 50° C., and the process can be readily controlled at temperatures not substantially above room temperature which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerzation progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The preferred molar ratio of component (2) to transition metal compound in our catalyst is within the range of 1:0.5 to 1:2 and the preferred molar ratio of component (2) to third component (3) in our catalyst is within the range of 10:1 to 1:5, but it will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, Decalin, and any of the other well known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

EXAMPLE 1

In a nitrogen-filled dry box, a 12-oz. tapered pressure bottle was charged in order with 120 ml. of dry benzene, 84.2 g. of dry 4-methyl-1-pentene and 3 g. of a catalyst consisting of ethylaluminum sesquichloride, N,N-dimethylthioacetamide, and activated titanium trichloride in a molar ratio of 4:3:12. The bottle was capped, placed on a rotating wheel in a constant-temperature water bath maintained at 80° C. and was allowed to remain under these conditions for 24 hours. At the end of this period, the bottle was removed, allowed to cool and opened. Isobutyl alcohol was added to the reaction mixture which was then transferred to a Waring Blendor. After washing several times with hot isobutyl alcohol in the blendor, the pure poly(4-methyl-1-pentene) was dried in air. The yield was 72 g. of pure poly(4-methyl-1-pentene) which showed a crystalline melting point of 235 to 240° C. and an inherent viscosity of 3.64.

EXAMPLE 2

The procedure of Example 1 was employed to polymerize one mole of 3-methyl-1-butene except that the N,N-dimethylthioacetamide was replaced by ethyl thiocyanate. The yield of highly crystalline poly(3-methyl-1-butene) was 48 g. This material had a crystalline melting point of 310° C. Solid polymer can also be prepared by replacing ethyl aluminum sesquichloride with sodium metal.

EXAMPLE 3

A clean, dry, stainless steel autoclave was charged, in a nitrogen-filled dry box, with 1 g. of catalyst comprising a mixture of ethylaluminum dichloride, tribenzylphosphine oxide, and titanium trichloride in a mole ratio of 2:2:3. The autoclave was removed from the dry box and 200 ml. of propylene was injected. The autoclave was attached to a rocking mechanism, and the temperature was raised to 85° C. After four hours, the autoclave was cooled, vented, and opened. A yield of 95 g. of highly crystalline polypropylene was obtained. This polymer had an inherent viscosity of 4.10 and was 97% crystalline as determined by extraction with dibutyl ether.

EXAMPLE 4

The procedure of Example 3 was employed to polymerize 1-butene except that pyridine-N-oxide was used in place of the tribenzylphosphine oxide. The yield of crystalline poly(1-butene) was 81 g. This polymer had an inhernt viscosity of 2.65 and contained only 7% of material soluble in methyl isobutyl ketone. Solid polymer can also be prepared by replacing ethyl aluminum dichloride with lithium metal.

EXAMPLE 5

The procedure of Example 1 was employed to polymerize one mole of 3-methyl-1-hexene except that the N,N-dimethylthioacetamide was replaced by 2,3-octanedione and no solvent was used. The yield was 81 grams of highly crystalline poly(3-methyl-1-hexene). An annealed sample of this polymer melts above 300° C.

EXAMPLE 6

The procedure of Example 1 was followed except that the N,N-dimethylthioacetamide was replaced with an equivalent quantity of diphenyl disulfide, $C_6H_5SSC_6H_5$. The yield of crystalline poly(4-methyl-1-pentene) melting at 235° C. (oriented sample) was 80 grams. The inherent viscosity of the poly(4-methyl-1-pentene) was 2.25. Solid polymer can also be prepared by replacing ethyl aluminum sesquichloride with sodium hydride.

EXAMPLE 7

The procedure of Example 1 was employed to copolymerize 75 g. of an equimolar mixture of 4-methyl-1-pentene and 3-methyl-1-butene in the absence of a solvent, except that N,N'-diphenylformamidine was used in place of the N,N-dimethylthioacetamide. The highly crystalline copolymer thus obtained weighed 49 g. and had an inherent viscosity of 1.45 in xylene at 100° C. Solid polymer can also be prepared by replacing ethyl aluminum sesquichloride with lithium aluminum hydride.

EXAMPLE 8

The procedure of Example 3 was employed to polymerize propylene using a catalyst comprised of ethylaluminum sesquichloride, dithiooxamide and titanium trichloride in a 2:1:3 mole ratio. A 90-gram yield of crystalline polypropylene was obtained. Solid polymer can also be prepared by replacing ethyl aluminum sesquichloride with potassium hydride.

EXAMPLE 9

The procedure of Example 1 was employed to polymerize one mole of allylcyclopentane except that β-chloroethyl ether was used in place of the N,N-dimethylthioacetamide. The crystalline poly(allylcyclopentane) obtained thereby weighed 87 grams and showed a crystalline melting point of 225 to 230° C. Solid polymer can also be prepared by replacing ethyl aluminum sesquichloride with sodium amyl.

EXAMPLE 10

The procedure of Example 1 was used to polymerize 75 grams of allylcyclohexane except that the N,N-dimethylthioacetamide was replaced with tetramethylthiourea. A 52-gram yield of crystalline poly(allylcyclohexane) melting at about 230° C. (oriented sample) was obtained.

EXAMPLE 11

The procedure of Example 1 was followed in polymerizing 50 g. of 4,4-dimethyl-1-pentene except that o-tolyl isocyanate was used in place of the N,N-dimethylthioacetamide. The resulting poly(4,4-dimethyl-1-pentene) was highly crystalline and did not melt at 350° C. The yield was 38 grams (76% of theory). Solid polymer can also be prepared by replacing ethyl aluminum sesquichloride with potassium metal.

EXAMPLE 12

The procedure of Example 3 was employed to polymerize propylene using ethylaluminum sesquichloride, nitrosobenzene and titanium trichloride in a 4:3:12 mole ratio. A quantitative yield of polypropylene was obtained which was soluble in hot dibutyl ether to the extent of only 3%. The inherent viscosity was 3.88. Solid polymer can also be prepared by replacing ethyl aluminum sesquichloride with lithium butyl.

EXAMPLE 13

The procedure of Example 1 was employed to polymerize 50 grams of allylbenzene using no solvent and using trimethylsulfonium iodide in place of the N,N-dimethylthioacetamide. A 31-gram yield of crystalline poly(allylbenzene) was obtained. This polymer melted at 203 to 208° C. (powder) and had an inherent viscosity (Tetralin at 145° C.) of 1.05.

EXAMPLE 14

The procedure of Example 1 was employed to polymerize 50 grams of styrene using tetramethylphosphonium bromide in place of the N,N-diamethylthioacetamide. The resulting polymer weighed 45 grams. This was extracted continuously with methyl ethyl ketone whereby the amorphous, non-crystallizable polystyrene was removed. the crystalline residue weighed 39 grams and showed a crystalline melting point of 250° C. The inherent viscosity of this crystalline polystyrene was 2.80. Vanadium trichloride gave excellent yields of crystalline polystyrene when used in place of the titanium trichloride above. Solid polymer can also be produced by replacing ethyl aluminum sesquichloride with aluminum triethyl.

EXAMPLE 15

The procedure of Example 3 was followed except that the tribenzylphosphine oxide was replaced by pyrazine. The yield of highly crystalline polypropylene was 74 grams having an inherent viscosity of 3.45. Similar results were obtained when malononitrile was used in place of the tribenzylphosphine oxide or pyrazine.

EXAMPLE 16

The procedure of Example 3 was followed except that the tribenezylphosphine oxide was replaced by phenylantimony oxide and the mole ratio was changed to 2:1:3. A 90-gram yield of highly crystalline polypropylene was obtained having an inherent viscosity of 4.0. Solid polymer can also be produced by replacing ethyl aluminum sesquichloride with ethyl magnesium bromide. Similar results were obtained when phenylarsenic oxide or tetramethyldiarsine was used in place of the tribenzylphosphine oxide of Example 3.

EXAMPLE 17

The procedure of Example 1 was followed except that the N,N-dimethylthioacetamide was replaced by an equivalent quantity of nitrobenzene. The yield was 54 grams of poly(4-methyl-1-pentene) having an inherent viscosity of 3.9. Similiar results were obtained using 2-nitropropane in place of the N,N-dimethyl-thioacetamide or the nitrobenezene above.

EXAMPLE 18

The procedure of Example 1 was followed using 2 grams of a catalyst comprised of a mixture of ethylaluminum dichloride, diphenyl disulfoxide ($C_6H_5SOSOC_6H_5$ or $C_6H_5SO_2$—S—$C_6H_5$) and vanadium trichloride in a mol ratio of 1:1:3. The highly crystalline poly(4-methyl-1-pentene) thus obtained weighed 75 grams and had an inherent viscosity in tetralin at 145° C. of 3.20.

EXAMPLE 19

The procedure of Example 3 was followed using 3 grams of catalyst comprised of a mixture of ethylaluminum sesquichloride, azoxybenzene, and titanium trichloride in a 2:1:3 mol ratio. A quantitative yield of crystalline polypropylene was obtained having an inherent viscosity of 4.85. Similar results were obtained when azobenzene of phosphazobenzene was used in place of the azoxybenzene above.

EXAMPLE 20

The procedure of Example 1 was followed except that the N,N-dimethylthioacetamide was replaced with an equivalent quantity of ethyl thiolacetate. The yield of pure, crystalline poly(4-methyl-1-pentene) was 65 grams. Phenyl isothiocyanate gave similar results when used in place of the N,N-dimethylthioacetamide of Example 1.

EXAMPLE 21

The procedure of Example 3 was followed except that the tribenzylphosphine oxide was replaced with an equivalent quantity of arsenobenzene. A good yield of crystalline polypropylene was obtained having an inherent viscosity of 3.5. Acetone phenylhydrazone gave similar results when used in place of the tribenzylphosphine oxide of Example 3.

EXAMPLE 22

The procedure of Example 1 was followed except that triphenylstibine sulfide was used in place of the N,N-dimethylthioacetamide. A good yield of crystalline poly (4-methyl-1-pentene) was obtained.

EXAMPLE 23

The procedure of Example 3 was followed using tetramethyldistibine in place of the tribenzylphosphine oxide. A good yield of crystalline polypropylene was obtained. A good yield of crystalline polypropylene was obtained also when arsenophosphobenzene was used instead of the tetramethyldistibine above.

Thus, by means of this invention, polyolefins such as polyethylene, polypropylene and polymers of higher molecular weight hydrocarbons, are readily produced using a catalyst combination whose activity, based on the knowledge of the art, could not have been predicted. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to mono-olefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:
1. In the polymerization of propylene to form solid, crystalline polymer, the improvement which comprises catalyzing the polymerization with a catalytic mixture comprising ethylaluminum sesquichloride, titanium trichloride and N,N-dimethylthioacetamide.

2. As a composition of matter, a catalyst for the polymerization of olefinic hydrocarbons to solid high modecular weight polymer comprising ethylaluminum sesquichloride, titanium trichloride and N,N-dimethylthioacetamide.

References Cited

UNITED STATES PATENTS

| | | | |
|---|---|---|---|
| 2,843,577 | 7/1958 | Friedlander et al. | 260—94.9 |
| 2,881,156 | 4/1959 | Pilar et al. | 260—94.9 |
| 3,177,189 | 4/1965 | Fuhrmann et al. | 260—93.7 |
| 3,210,332 | 10/1965 | Lyons et al. | 260—93.7 |
| 3,219,651 | 11/1965 | Hill et al. | 260—94.9 |

FOREIGN PATENTS

| | | | |
|---|---|---|---|
| 809,717 | 3/1959 | Great Britain | 260—94.9 |
| 851,113 | 10/1960 | Great Britain | 260—94.9 |

JOSEPH L. SCHOFER, Primary Examiner

E. J. SMITH Assistant Examiner